L. DE BAY.
APPARATUS FOR TRANSPORTING AND MANIPULATING SHEETS OF PLATE GLASS.
APPLICATION FILED JUNE 14, 1910.
977,279.
Patented Nov. 29, 1910.
2 SHEETS—SHEET 1.
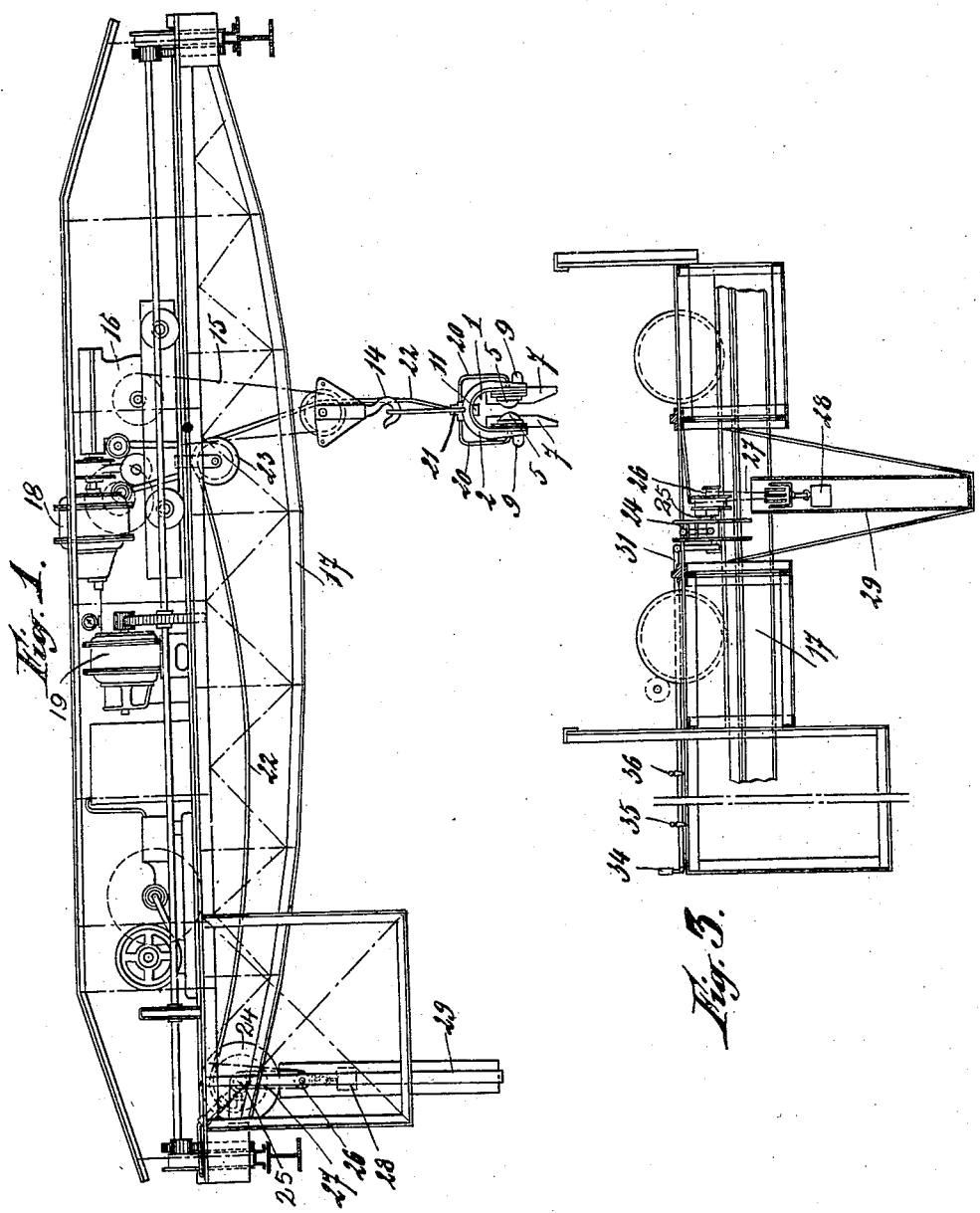

L. DE BAY.
APPARATUS FOR TRANSPORTING AND MANIPULATING SHEETS OF PLATE GLASS.
APPLICATION FILED JUNE 14, 1910.
977,279.
Patented Nov. 29, 1910.
2 SHEETS—SHEET 2.
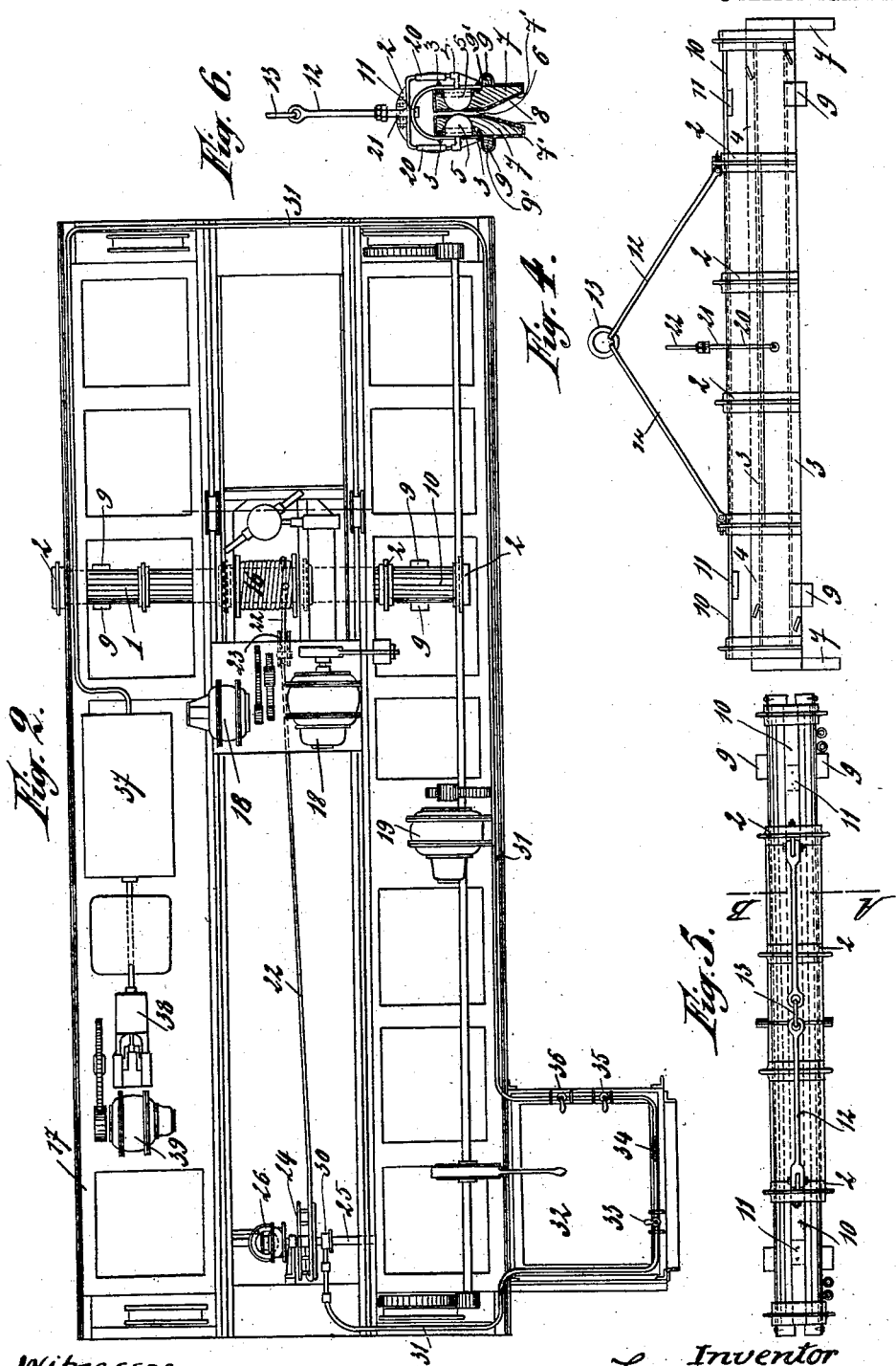
Witnesses
Inventor
Lucien De Bay
by
Rosenbaum & Stockbridge
Attys

UNITED STATES PATENT OFFICE.

LUCIEN DE BAY, OF AUVELAIS, BELGIUM.

APPARATUS FOR TRANSPORTING AND MANIPULATING SHEETS OF PLATE-GLASS.

977,279.  Specification of Letters Patent.  Patented Nov. 29, 1910.

Application filed June 14, 1910. Serial No. 566,781.

*To all whom it may concern:*

Be it known that I, LUCIEN DE BAY, a subject of the King of Belgium, residing at Auvelais, in the Kingdom of Belgium, have invented new and useful Improvements in Apparatus for Transporting and Manipulating Sheets of Plate-Glass, of which the following is a specification.

This invention relates to an apparatus for transporting sheets of plate-glass by means of compressed air, in which the sheets are gripped between two pneumatic cushions acting like the jaws of a pair of tongs, the said cushions being combined with a suitable supporting frame suspended from a lifting machine on a traveling bridge and being connected to a compressed air distributing arrangement which allows of determining or causing to cease, as required, the pressure of the pneumatic cushions upon the glass plate to be transported.

According to the invention the pneumatic gripper designed to grip the glass plate to be transported, is formed of a certain number of stirrup-shaped supports connected together by angle bars between which are arranged air chambers provided with covers similar to those employed in the construction of pneumatic tires.

The supporting framing formed by the stirrups and angle bars is provided at its ends with special wooden guiding arrangements covered with felt and designed to facilitate the guiding of the gripper, as it descends on to the glass plate to be transported and to avoid damage to the said glass plate or to the neighboring sheets by the metal parts of the apparatus.

According to the invention, moreover, the said gripper which is combined with the lifting machine of a traveling bridge is supplied with compressed air by means of apparatus erected on the traveling bridge itself, and the manipulation of the gripper is entirely effected from the traveling bridge. To this end and in order to allow the indispensable displacement of the gripper with the lifting machine of the traveling bridge, the air distribution is effected through the medium of a flexible pipe which is wound upon a counter-weighted drum and which is connected to the compressed air conduits proper by a passage made in the shaft of the winding drum so that the length of this flexible pipe varies automatically according to the position occupied by the gripper with relation to the winding drum of its feed pipe.

The accompanying drawings show an apparatus constructed according to the invention.

Figure 1 is a front elevation of the entire apparatus. Fig. 2 is a plan view showing more particularly the compressed air distribution. Fig. 3 is a transverse section through the traveling bridge showing separately the winding drum of the flexible pipe for feeding the gripper. Figs. 4, 5 and 6 are respectively a side elevation, a plan and a transverse section (on the line A B Fig. 5) of the gripper.

In Figs. 1 and 2, 1 indicates the pneumatic gripper designed to act upon the sheets of glass when about to transport or manipulate them. This gripper is constructed as shown in Figs. 4 to 6. It comprises a certain number of stirrups 2 formed, for example, of angle irons connected together by longitudinal angle bars 3 coöperating with iron-plates 4 extending the whole length of the gripper. Between the angle bars 3 are placed two air chambers 5 protected by covers 6. At the ends the supporting frame formed by the stirrups 2 and the angle bars 3 is provided with wooden pieces 7 covered with felt 7′, forming together an angular opening 8 designed to facilitate the introduction of the glass plate between the pneumatic cushions formed by the air chambers 5 when the gripper descends on to the plate. Lateral projections 9 of wood covered with felt 9′ are designed to protect the neighboring sheet or plate from contact with the metal parts of the gripper when the latter descends on to a plate which may be very near to other neighboring plates. The complete supporting frame formed by the stirrups 2 is provided at its upper part with a flat iron plate 10 carrying india-rubber cushions 11 for preventing the glass plate from being broken if the apparatus should descend too low. The complete gripper is carried by rods or by chains 12 and a ring 13, upon the hook 14 suspended by the rope 15 (Fig. 1) of the windlass 16 from a traveling bridge 17. This windlass as well as the traveling bridge itself are actuated in the ordinary manner by electric motors 18 and 19.

Each of the pneumatic cushions 5 is connected by a flexible connection 20 to a distributing pipe 21, itself connected to a flexible pipe 22, passing over a guide pulley 23 and extending to a drum 24 mounted upon a shaft 25. This drum is combined with a set of pulleys 26 supportingly, by means of a rope 27, a counter-weight 28 movable in a tubular guide 29 carried by the frame of the traveling bridge. The end of the flexible pipe 22 is connected on the drum 24 to the hollow shaft of the said drum which is itself in communication by a suitable connection 30 with the distributing pipe proper 31 for the compressed air. This pipe passes through the cabin 32 whence the traveling bridge is controlled. It is provided in this cabin with a safety valve 33, a pressure gage 34, a three-way cock 35 and a stop-cock 36. The other end of the pipe 31 is connected to a compressed air reservoir 37 combined directly with an air compressor 38 actuated by a motor 39. This motor as well as the compressor and the reservoir 37 are erected on the frame of the traveling bridge. The three-way cock 35 is arranged so as to place the two parts of the pipe 31 in communication with each other (that is to say that coming from the compressed air reservoir 37 and that leading from the connection 30 of the winding drum 24), or again, so as to place sometimes the part of the pipe 31 coming from the reservoir 37 in communication with the atmosphere for the purpose of emptying the said reservoir, and sometimes the part of the pipe 31 coming from the connection 30 for the purpose of stopping the effect of the compressed air in the pneumatic cushions 5 of the gripper 1.

With these explanations it is easy to understand the general working of the whole of the described apparatus.

A reserve of compressed air being contained in the reservoir 37, it is only necessary, when requiring to transport a sheet or plate of glass to bring the traveling bridge to the required place in the glasshouse and to allow the gripper 1 to descend on to the sheet of glass to be transported slightly separated from the neighboring sheets so as to be presented in a vertical direction. During the descent of the gripper 1, or during the transverse displacement of the windlass 16 on the traveling bridge to bring the gripper into the required position, the flexible pipe 22 unwinds from the drum 24 and lifts the counter-weight 28. When the gripper has reached the required height and is resting with the india-rubber cushions or plugs 11 (Fig. 4) on the upper edge of the glass plate the workman manipulating the apparatus opens the three-way cock 35 so as to connect the pneumatic cushions 5 with the reservoir 37. Under the effect of the pressure the cushions clamp the plate with sufficient force to allow it to be lifted by putting the windlass 16 in motion. During the displacement of the gripper, either by reason of its being lifted, or by reason of the movement of the carriage of the windlass of the traveling bridge, the flexible pipe 22 becomes wound, if necessary, on the drum 24 under the effect of the counter-weight 28 or unwinds from the said drum according to the variation of the positions of the windlass 16 with relation to the drum 24, without any interruption taking place in the action of the compressed air. When the glass plate has been transported to the required place it is only necessary to turn the threeway cock 35 so as to allow the compressed air, which has acted in the pneumatic cushions 5 to escape into the atmosphere. The gripper is then immediately disengaged and can be raised and displaced for a fresh operation.

Having thus described my invention, what I claim is:

1. An apparatus for the manipulation and transport of sheets of plate-glass said apparatus comprising a gripper, pneumatic cushions formed on said gripper; means for distributing a fluid under pressure to said cushions and means for lifting and transporting said gripper.

2. An apparatus for the manipulation and transport of sheets of plate-glass, said apparatus comprising a gripper, pneumatic cushions formed on said gripper, means for lifting and transporting said gripper and means for controlling the supply of a fluid under pressure to the cushions of the gripper.

3. An apparatus for the manipulation and transport of sheets of plate-glass, said apparatus comprising a gripper, pneumatic cushions formed on said gripper, means for lifting and transporting said gripper and controlling means for supplying a fluid under pressure to said cushions, the said controlling means being carried by the lifting and transporting means for the gripper.

4. An apparatus for the manipulation and transport of sheets of plate-glass, said apparatus comprising a gripper, pneumatic cushions formed on said gripper, a traveling bridge, a lifting machine on said bridge and means for controlling a supply of air under pressure from said traveling bridge to the pneumatic cushions.

5. An apparatus for the manipulation and transport of sheets of plate-glass, said apparatus comprising a gripper, pneumatic cushions formed on said gripper, a traveling bridge, a lifting machine on said bridge, said machine carrying the gripper, a reservoir of air under pressure mounted on the traveling bridge and means for supplying air under pressure from said reservoir to the pneumatic cushions notwithstanding the displacements of the gripper with relation to the reservoir mounted on the bridge.

6. An apparatus for the manipulation and transport of sheets of plate-glass, said apparatus comprising a gripper, pneumatic cushions formed on said gripper, a traveling bridge, a lifting machine mounted on said bridge, said lifting machine carrying the gripper, means for producing air under pressure, the said means being mounted on the traveling bridge, a reservoir of air under pressure mounted on the traveling bridge and means for supplying air under pressure from said reservoir to the pneumatic cushions notwithstanding the displacements of the gripper with relation to the reservoir mounted on the bridge.

7. In an apparatus of the kind described, a gripper, pneumatic cushions formed on said gripper, a traveling bridge, a lifting machine mounted on said bridge, said lifting machine carrying the gripper, means for producing air under pressure, the said means being mounted on the traveling bridge, a reservoir of air under pressure mounted on the traveling bridge, a drum rotatably mounted on the traveling bridge, a pipe connecting the center of said drum to the reservoir of air under pressure and a flexible pipe wound on said drum and connecting said drum to the pneumatic cushions of the gripper, whereby air under pressure is supplied to said cushions notwithstanding the displacements of the gripper with relation to the reservoir mounted on the bridge.

8. In an apparatus of the kind described a lifting and traveling machine, means for producing air under pressure, said means being mounted on the lifting and traveling machine, a gripper carried by the lifting and traveling machine, said gripper comprising a supporting frame, pneumatic cushions extending along said supporting frame and means for supplying air under pressure from the lifting and traveling machine to said pneumatic cushions substantially as described.

9. In an apparatus of the kind described a lifting and traveling machine, means for producing air under pressure, said means being mounted on the lifting and traveling machine, a gripper carried by the lifting and traveling machine, said gripper comprising a supporting frame, pneumatic cushions extending along said supporting frame, means at the ends of the supporting frame, whereby the engagement of the gripper upon the sheets of plate-glass is facilitated and means for controlling the supply of air under pressure from the lifting and traveling machine to the pneumatic cushions of the gripper, substantially as described.

In testimony whereof I have signed my name to this specification in the presence of two subscribing witnesses.

LUCIEN DE BAY.

Witnesses:
JOYCE BEDE,
M. C. JERBEAULT.